United States Patent [19]
Horch et al.

[11] Patent Number: 4,589,623
[45] Date of Patent: May 20, 1986

[54] MOLD FOR PRODUCING T-SHAPED RUBBER HOSES

[75] Inventors: Frank Horch, Buxtehude; Hermann Brockmann, Buchholz; Hans-Georg Fuchs, Buxtehude, all of Fed. Rep. of Germany

[73] Assignee: Phoenix Aktiengesellschaft, Hamburg, Fed. Rep. of Germany

[21] Appl. No.: 668,415

[22] Filed: Nov. 5, 1984

[30] Foreign Application Priority Data

Feb. 3, 1984 [DE] Fed. Rep. of Germany ....... 3403727

[51] Int. Cl.⁴ .................. B29C 33/50; B29C 33/56
[52] U.S. Cl. ........................................ 249/83; 249/96; 249/134; 249/145
[58] Field of Search ............... 249/90, 93, 95, 122, 249/134, 150, 145, 83; 264/263, 262

[56] References Cited

U.S. PATENT DOCUMENTS 2,181,256 11/1939 Arbogast ............................. 249/145
3,414,951 12/1968 Schulze ............................... 249/145
4,098,856 7/1978 Rosenau .............................. 249/134

FOREIGN PATENT DOCUMENTS 2823644 12/1978 Fed. Rep. of Germany .
3303519 9/1984 Fed. Rep. of Germany .

Primary Examiner—Willard E. Hoag
Attorney, Agent, or Firm—Collard, Roe & Galgano

[57] ABSTRACT

The invention relates to a mold for producing a T-shaped hose composed of a main hose having a sidewall with an opening and a secondary hose joined at one end to the sidewall opening of the main hose to form a "T". The mold includes a main mandrel for the main hose having a disk-shaped recess on which the main hose is mountable with its opening in registry with the mandrel recess and a secondary mandrel for the secondary hose having a cylindrical recess adjacent to one end thereof. The secondary mandrel is disengageably secured at the one end thereof to the main mandrel adjacent to the recess thereof, so that the mandrels are arranged in the form of a "T" and cooperate with one another to define an interior mold cavity at the zone of connection. The mold further includes an outer mold part that is mountable on the main hose and the secondary hose after each has been mounted on its respective mandrel parts. The outer mold part then surrounds the hoses in the zone of connection to define between the hoses and itself an exterior mold cavity.

5 Claims, 2 Drawing Figures

MOLD FOR PRODUCING T-SHAPED RUBBER HOSES

BACKGROUND OF THE INVENTION

The invention relates to a mold for producing a T-shaped hose from hose segments made of rubber with reinforcing linings embedded therein. More particularly, the invention relates to such a mold which includes inner mold parts for a main hose and a secondary hose, which parts are detachably joined to each other through a wall opening provided in the main hose, and an outer molding part surrounding the zone of connection between the main and secondary hoses.

The manufacture of T-shaped hoses has recently gained in significance because their field of application has expanded. Such hoses are currently used not only for motor vehicle engines, washing machines or dishwashers, but in other articles as well. Such hoses require a reliable and safe joint in the zone of connection to absorb the substantial pressures that these hoses must often endure. Furthermore, such a hose structure requires that the fiber linings not be adversely affected by the liquids or fluids passing through the hose.

Suitable processes and molds are known for the manufacture of such T-shaped hoses from rubber or a rubber-like material. However, such molds pose problems if the manufacturing process is to be largely mechanized since there is no assurance that all requirements for the construction of the T-shaped zone of connection can be met.

A mold for the manufacture of T-shaped hoses of the general type specified above is known, for example from German laid-open patent specification DE-OS No. 28 23 644; however, in a high-speed, mechanized manufacturing operation, the overlapping of the beaded or flanged parts as specified in that patent may lead to problems.

SUMMARY OF THE INVENTION

It is therefore an object of the present invention to provide a mold that is relatively trouble-free and ensures a safe connection or joint in T-shaped hoses.

According to the present invention, this and other related objects are achieved by providing a mold of the type specified above with a mandrel part for the secondary hose that has a cylindrical recess on its joined end, and a mandrel part for the main hose having a disk-shaped recess within its zone of connection.

Therefore, the most important feature of the invention is that the joined mandrels are provided within their zone of connection with recesses that are easily fitted into one another. The recesses may have a depth amounting to about 10 to 30% of the diameter of the hose. Before the two vulcanized parts of the hose are fitted together, an apertured rubber disk and a hollow rubber cylinder may be inserted in such recesses in the nonvulcanized state. When the mold surrounding the T-shaped zone of connection is then closed, the edge surrounding the hole in the main hose and the edge at the end of the secondary hose are fully backed by a rubber mass, with complete coverage of the inside of the T-zone of the hose obtained by the vulcanization, which is carried out under pressure. For this manufacturing procedure it is unimportant whether the fabric linings projecting from the opening and at the end of the hose are preshaped in some conical form or not. The mass of rubber present beneath the zone of connection leads to a thicker wall resulting in increased pressure absorbency. The cylinder jacket (i.e., the vulcanized rubber cylinder), which may have a thickness of 1 to 3 mm, or the disk-shaped layer (i.e., the vulcanized rubber disk) of the same thickness does not interfere with the flow of the fluid because the edges of the recess may be flattened.

In a preferred embodiment of the invention, another hollow space or cavity is additionally formed by an outer mold opposing the two hose parts within the zone of connection. A rubber mass may be admitted into this cavity also which also will lead to a thickening of the wall in the area of the zone when the parts of the hose are combined by vulcanization. The hollow space may be limited to a small section within the zone of connection between the main and secondary hose. Preferably, a rubber compound is used that is as non-yielding as possible. The rubber compound may contain embedded fiber material in order to increase the stressability of the T-hose within the zone or range of the T.

Preferebly, the two mandrels, made of metal, are joined with each other by a threaded connection so that the mandrels can be easily removed from the hose once the vulcanization is completed. However, if the branching is far removed from the end of the hose, the mandrel parts may be connected to each other by means of cable-like pulling elements by which these mandrel parts may be pulled from the finished T-shaped hose. It is possible also to manufacture the mandrels using a tenacious plastic material, e.g., polyurethane. This has the advantage that the mandrels contract slightly when pulled out of the hose, permitting their easy removal from the hose. The mandrel part for the secondary hose, may comprise as a separate part a threaded connection or a similar type of connection to facilitate the release of this mandrel part from the mandrel part in the main hose. The surface of the mandrels should be coated with polytetrafluoroethylene so that the mandrel can be removed from the hose with greater ease once the vulcanization has been complete and the mandrels have been released from each other.

Other objects and features of the present invention will become apparent from the following detailed description considered in connection with the accompanying drawings, which disclose two embodiments of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENTS

Figure 1:
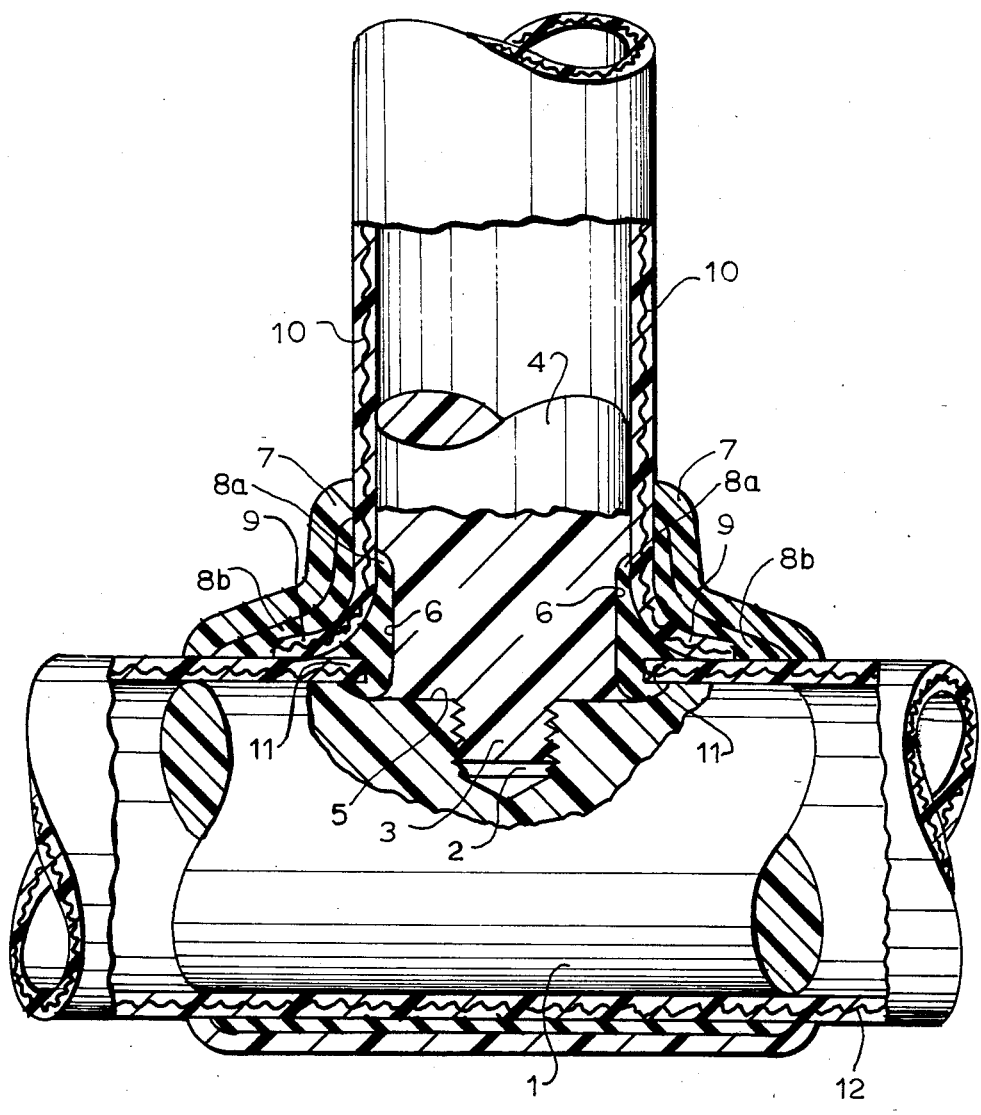
FIG. 1 is a cross-sectional view, in part elevation, of the mandrel and the mold surrounding the hose in its joined state.

Turning now in detail to the drawings, and in particular to FIG. 1 thereof, therein illustrated is a novel mold for use in the production of T-shaped rubber hoses which includes a main mandrel 1 for the main hose 12. Mandrel 1 has an internally-threaded bore 2 into which a threaded pin 3 of a secondary mandrel 4 for the secondary hose 10 is screwed. Main mandrel 1 has a disk-shaped recess 5 extending around the bore 2. Secondary mandrel 4 also has a cylindrical recess 6 provided at its front end. An exterior mold part 7 is provided that extends around the zone of the T-shaped connection or joint, and also surrounds the hoses 10 and 12 within the zone of the T-shaped connection or joint.

When the two mandrels 1 and 4 are in their joined state, the recess 5 in the side face of the main mandrel 1 is situated adjacent to and in open communication with the lower end of the cylindrical recess 6, and a space is created (shown filled) which comprises a section of the disk-shaped recess 5 and the cylindrical recess 6. Before mandrels 1 and 4 are assembled or joined, a sleeve made of a non-vulcanized rubber mixture is placed on the secondary mandrel 4 in recess 6. In the embodiment shown, one sleeve suffices, which fully fills the two recesses 5 and 6 within the zones provided.

A second rubber mixture 8 along with the rubber mixture present in the two recesses 5 and 6 are put under pressure by the outer mold part 7 and vulcanized in this pressurized state after the spaces are completely filled to form rubber sealing elements 8a and 8b. The flanged end 9 of the secondary hose 10 and the edge 11 of the main hose 12 are thus completely embedded in rubber.

Figure 2:
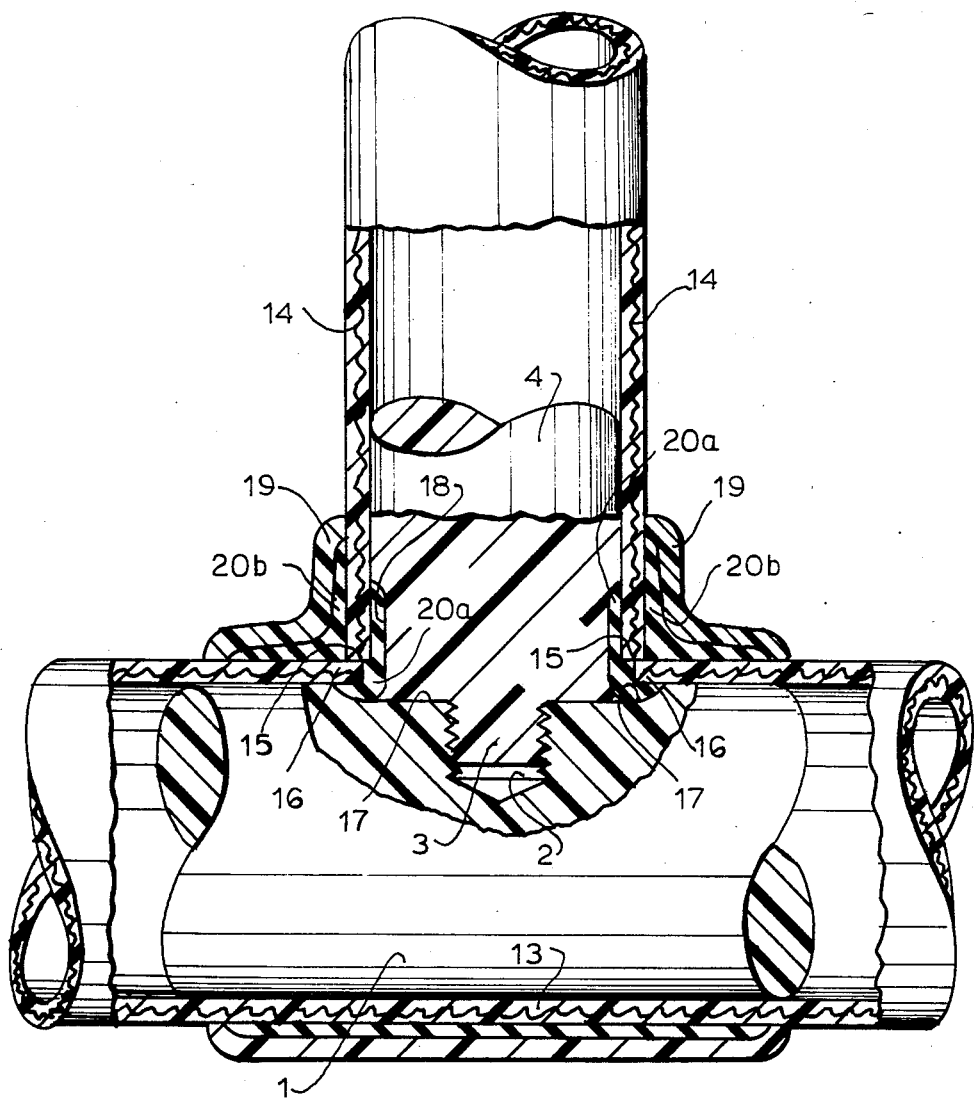
FIG. 2 is a view comparable to that of FIG. 1, but showing a different embodiment of the present invention.

FIG. 2 illustrates another embodiment of the invention which affords a simpler connection between a main hose 13 and a secondary hose 14. With this joint, the end face 15 of the secondary hose 14 is butt-joined with the edge 16 of the main hose 13. The recesses 17 and 18 are slightly smaller because less space is required and, also, the exterior mold part 19 surrounding the zone of the T-joint defines a slightly smaller space for the rubber compound mixture which, when vulcanized, form rubber sealing elements 20a and 20b, respectively.

Thus, while only two embodiments of the invention have been shown and described, it will be obvious that many changes and modifications may be made thereunto, without departing from the spirit and scope of the invention.

What is claimed is:

1. A mold for producing a T-shaped rubber hose composed of a main hose having a sidewall with an opening therein defining an edge and a secondary hose joined at one end to the main hose adjacent to the opening thereof so that together they form a T, comprising:

a main mandrel having a disk-shaped recess formed therein on which the main hose is mountable with the opening thereof disposed adjacent to, and in substantial registry with, said main mandrel recess;

a secondary mandrel on which the secondary hose is mountable, said secondary mandrel having a cylindrical recess adjacent to one end thereof adapted to receive a vulcanizable rubber sleeve thereon and being disengageably secured at said one end to said main mandrel adjacent to said main mandrel recess so that said mandrels are arranged in the form of a T and so that said respective recesses thereof communicate and cooperate with one another to define an interior mold cavity, whereby when the hoses are mounted on said respective mandrels they will be disposed in the form of a T and when the rubber sleeve is vulcanized under pressure it will fill said interior mold cavity; and an outer mold part mountable on the main hose and the secondary hose after they are mounted on said main mandrel and said secondary mandrel respectively, said outer mold part being configured and dimensioned to surround the hoses in the zone of connection thereof and to define between the hoses and itself an exterior mold cavity adapted to receive a vulcanizable rubber mixture therein which when vulcanized under pressure fills said exterior mold cavity, whereby the end of said secondary hose and the edge of the opening in the sidewall of said main hose are embedded in rubber.

2. The mold as defined in claim 1, wherein said mandrels are made of polyurethane.

3. The mold as defined in claim 3, wherein said mandrels are coated with polytetrafluoroethylene.

4. The mold as defined in claim 1, wherein said mandrels are joined with each other by a threaded connection so that said mandrels can be easily removed from the T-shaped hose once vulcanization is completed.

5. The mold as defined in claim 5, wherein said main mandrel has an internally-threaded bore and wherein said secondary mandrel has a threaded pin receivable in said bore.

* * * * *